United States Patent
Windisch (12)

(10) Patent No.: US 6,383,971 B1
(45) Date of Patent: May 7, 2002

(54) CATALYST WITH A BASE CONSISTING OF COMPOUNDS OF THE RARE EARTH METALS FOR POLYMERIZING UNSATURATED ORGANIC COMPOUNDS

(75) Inventor: Heike Windisch, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/529,767
(22) PCT Filed: Oct. 7, 1998
(86) PCT No.: PCT/EP98/06376
    § 371 Date: Apr. 18, 2000
    § 102(e) Date: Apr. 18, 2000
(87) PCT Pub. No.: WO99/20670
    PCT Pub. Date: Apr. 29, 1999

(30) Foreign Application Priority Data

Oct. 20, 1997 (DE) .......................................... 197 46 266

(51) Int. Cl.$^7$ ............................................... B01J 31/00
(52) U.S. Cl. ........................ 502/170; 502/103; 502/104; 526/164; 526/161; 526/172; 526/335; 526/348.6
(58) Field of Search .................................. 526/164, 335; 502/103, 118, 170

(56) References Cited

U.S. PATENT DOCUMENTS

| | | |
|---|---|---|
| 4,429,089 A | 1/1984 | Pedretti et al. .............. 526/153 |
| 4,436,884 A | 3/1984 | Carbonaro et al. .......... 526/111 |
| 4,444,903 A | 4/1984 | Carbonaro et al. .......... 502/102 |
| 4,525,549 A | 6/1985 | Carbonaro et al. ........... 526/92 |
| 4,699,960 A | 10/1987 | Gordini et al. ................ 526/81 |
| 5,627,119 A | 5/1997 | Biagini et al. ............... 502/152 |
| 5,686,371 A | 11/1997 | Ansell et al. ................ 502/102 |
| 5,914,377 A * | 6/1999 | Sylvester et al. ........... 526/164 |
| 5,958,820 A * | 9/1999 | Taube et al. ................. 502/102 |

FOREIGN PATENT DOCUMENTS

| CA | 1 143 711 | 3/1983 | |
|---|---|---|---|
| EP | 0 637 589 | 2/1995 | |
| EP | 0 667 357 | 8/1995 | |
| EP | 0819139 B1 * | 3/1996 | ........... C08F/36/04 |

OTHER PUBLICATIONS

Ege, S. N. Organic Chemistry, 3$^{rd}$ Ed., D. C. Heath and Company: Lexington, MA 1994.*
Ullmanns Encyklopädie der technischen Chemie, vol. 19, (month unavailable) 1980, pp. 265–295, Simon et al, Polystyrol einschließlich ABS und SAN.

* cited by examiner

Primary Examiner—David W. Wu
Assistant Examiner—Rip A Lee
(74) Attorney, Agent, or Firm—Joseph C. Gil; Richard E. L. Henderson

(57) ABSTRACT

The invention relates to new catalysts based on compounds of the rare earth metals containing a compound of the rare earth metals, a cyclopentadiene, and an alumoxane, as well as the use of new catalysts for the polymerisation of unsaturated compounds, particularly conjugated dienes. With the new catalyst system it is possible in the polymerisation of conjugated dienes to obtain a substantially higher proportion of laterally bound vinyl groups in the polymers.

8 Claims, No Drawings

CATALYST WITH A BASE CONSISTING OF COMPOUNDS OF THE RARE EARTH METALS FOR POLYMERIZING UNSATURATED ORGANIC COMPOUNDS

The present invention relates to new catalysts based on compounds of the rare earth metals as well as the use of the new catalysts for the polymerisation of unsaturated compounds, in particular conjugated dienes.

The polymerisation of unsaturated organic compounds, in particular conjugated dienes, in the presence of catalysts based on rare earth metals has been known for a long time (see for example DE 28 33 721, U.S. Pat. No. 4,429,089, EP 76 535, EP 92 270, EP 92 271, EP 207 558. WO 93/05083, U.S. Pat. No. 5,627,119, EP 667 357, U.S. Pat. No. 3,478, 901, EP 637 589). In this connection the Ziegler-Natta catalysts based on the rare earth metals have proved to be particularly suitable. For example, EP 11 184 proposes a catalyst system based on the rare earth metals, in particular based on neodymium compounds, which is particularly suitable for the polymerisation of conjugated dienes, in particular butadiene. In the polymerisation of for example butadiene these catalysts provide a polybutadiene in very good yields and with high selectivity, which is characterised in particular by a high proportion of cis-1,4 units. However, the disadvantage of the use of these catalysts for the polymerisation of conjugated dienes is the small proportion of laterally bound vinyl groups (1,2 units) in the polymer. The proportion of 1,2-double bonds in the polymer is thus often less than 1%.

Catalysts based on structurally defined allyl complexes of the rare earth metals have been described in WO 96/31 544, by means of which diene rubbers are obtained containing a high proportion of 1,4-cis-double bonds and more than 1% of 1,2-double bonds. A serious disadvantage of the use of these catalysts is that, being structurally defined allyl compounds, they are very difficult and expensive to produce and are thus not competitive with the generally more inexpensive Ziegler-Natta catalysts, which are moreover available in any desire amounts.

The aim of the present invention is accordingly to provide a catalyst system based on the rare earth metals, by means of which in the polymerisation of conjugated dienes a substantially higher proportion of laterally bound vinyl groups can be obtained in the polymer. Polydienes with a high proportion of lateral 1,2-double bonds in polymers have a great influence in particular with regard to their use as modifiers in plastics, in order to improve for example the impact strength. Examples of such rubber/plastics combinations are HIPS and ABS (Ullmann, 4th Edition, Vol. 19, p. 265 ff and p. 277 ff). It is furthermore desirable-for economic reasons—that the catalysts can be used in readily available aliphatic solvents and that, with their use, the 1,4-cis and 1,4-trans content in the polydienes can be controlled while at the same time maintaining a uniform content of 1,2-double bonds in the polymer.

The present invention thus relates to a catalyst based on compounds of the rare earth metals, comprising:
a) a compound of tile rare earth metals,
b) a cyclopentadiene, and
c) an alumoxane,
the molar ratio of the components (a):(b):(c) being in the range from 1:0.01 to 1.99:1 to 1000.

The molar ratio of the components (a):(b):(c) is preferably in the range from 1:0.2 to 1.8:3 to 500, particularly preferably in the range 1:0.5 to 1.5:5 to 100.

Compounds of the rare earth metals (component (a)) that are particularly suitable are those selected from an alcoholate of the rare earth metals.
a phosphonate, phosphinate and/or phosphate of the rare earth metals,
a carboxylate of the rare earth metals,
a complex compound of the rare earth metals with diketones and/or
an addition compound of the halides of the rare earth metals with an oxygen donor or nitrogen donor compound.

The aforementioned compounds of the rare earth metals are for example described in more detail in EP 11 184.

The compounds of the rare earth metals are in particular based on the elements with the atomic numbers 21, 39 and 57 to 71. Lanthanum, praseodymium or neodymium or a mixture of elements of the rare earth metals that contains at least one of the elements lanthanum, praseodymium or neodymium in an amount of at least 10 wt. % are preferably used as rare earth metals. Lanthanum or neodymium are particularly preferably used as rare earth metals, which again may be used mixed with other rare earth metals. The proportion of lanthanum and/or neodymium in such a mixture is particularly preferably at least 30 wt. %.

Suitable alcoholates, phosphonates, phosphinates and carboxylates of the rare earth metals or suitable complex compounds of the rare earth metals with diketones are in particular those in which the organic group contained in the compounds contains in particular straight-chain or branched alkyl radicals with 1 to 20 carbon atoms, preferably 1 to 15 carbon atoms, such as methyl, ethyl, n-propyl, n-butyl, n-pentyl, isopropyl, isobutyl, tert.-butyl, 2-ethylhexyl, neopentyl, neo-octyl, neo-decyl or neo-dodecyl radicals.

As alcoholates of the rare earth metals there may for example be mentioned:
Neodymium(III) n-propanolate, neodymium(III) n-butanolate, neodymium(III) n-decanolate, neodymium (III) iso-propanolate, neodymium(III) 2-ethly-hexanolate, praseodymium(III) n-propanolate, praseodymium(III) n-butanolate, praseodymium(III) n-decanolate, praseodymium(III) iso-propanolate, praseodymium(III) 2-ethyl-hexanolate, lanthanum(III) n-propanolate, lanthanum(III) n-butanolate, lanthanum(III) n-decanolate, lanthanum(III) iso-propanolate, lanthanum(III) 2-ethyl-hexanolate, preferably neodymium(III) n-butanolate, neodymium(III) n-decanolate, neodymium(III) 2-ethylhexanolate.

As suitable phosphonates, phosphinates and phosphates of the rare earth metals there may for example be mentioned: neodymium(III) dibutyl phosphonate, neodymium(III) dipentyl phosphonate, neodymium(III) dihexyl phosphonate, neodymium(III) diheptyl phosphonate, neodymium(III) dioctyl phosphonate, neodymium(III) dinonyl phosphonate, neodymium(III) didodecyl phosphonate, neodymium (III) dibutyl phosphinate, neodymium(III) dipentyl phosphinate neodymium(III) dihexyl phosphinate, neodymium(III) diheptyl phosphinate neodymium(III dioctyl phosphinate neodymium(III) dinonyl phosphinate, neodymium(III) didodecyl phosphinate, and neodymium(III) phosphate, preferably neodymium(III) dioctyl phosphinate and neodymium(III) dioctyl phosphinate.

Suitable carboxylates of the rare earth metals are:
Lanthanum(III) propionate, lanthanum(III) diethylacetate, lanthanum(III) 2-ethylhexanoate, lanthanum (III) stearate, lanthanum(III) benzoate, lanthanum(III) cyclohexanecarboxylate, lanthanum(III) oleate, lanthanum (III) versatate, lanthanum(III) naphthenate, praseodymium (III) propionate, praseodymium(III) diethylacetate, praseodymium(III) 2-ethylhexanoate, praseodymium(III) stearate, praseodymium(III) benzoate, praseodymium(III) cyclohexanecarboxylate, praseodymium(III) oleate, praseodymium(III) versatate, praseodymium(III) naphthenate, neodymium(III) propionate, neodymium(III) diethylacetate, neodymium(III) 2-ethylhexanoate, neodymium(III) stearate, neodymium(III) benzoate, neodymium(III) cyclohexanecarboxylate, neodymium(III) oleate, neodymium(III) versatate, neodymium(III) naphthenate, preferably neodymium(III) 2-ethylhexanoate, neodymium(III) versatate, neodymium(III) naphthenate. Neodymium versatate is particularly preferred.

As complex compounds of the rare earth metals with diketones, there may be mentioned:

Lanthanum(III) acetylacetonate, praseodymium(III) acetylacetonate, neodymium(III) acetylacetonate, preferably neodymium(III) acetylacetonate.

As addition compounds of the halides of the rare earth metals with an oxygen donor or a nitrogen donor compound, there may for example be mentioned: Lanthanum(III) chloride with tributyl phosphate, lanthanum(III) chloride with tetrahydrofuran, lanthanum(III) chloride with iso-propanol, lanthanum(III) chloride with pyridine, lanthanum(III) chloride with 2-ethylhexanol, lanthanum(III) chloride with ethanol, praseodymium(III) chloride with tributyl phosphate, praseodymium(III) chloride with tetrahydrofuran, praseodymium(III) chloride with iso-propanol, praseodymium(III) chloride with pyridine, praseodymium(III) chloride with 2-ethylhexanol, praseodymium(III) chloride with ethanol, neodymium(III) chloride with tributyl phosphate, neodymium(III) chloride with tetrahydrofuran, neodymium(III) chloride with iso-propanol, neodymium(III) chloride with pyridine, neodymium(III) chloride with 2-ethylhexanol, neodymium (III) chloride with ethanol, lanthanum(III) bromide with tributyl phosphate, lanthanum(III) bromide with tetrahydrofuran, lanthanum(III) bromide with iso-propanol, lanthanum(III) bromide with pyridine, lanthanum(III) bromide with 2-ethylhexanol, lanthanum(III) bromide with ethanol, praseodymium(III) bromide with tributyl phosphate, praseodymium(III) bromide with tetrahydrofuran, praseodymium(III) bromide with iso-propanol, praseodymium(III) bromide with pyridine, praseodymium(III) bromide with 2-ethylhexanol, praseodymium(III) bromide with ethanol, neodymium(III) bromide with tributyl phosphate, neodymium(III) bromide with tetrahydrofuran, neodymium(III) bromide with iso-propanol, neodymium(III) bromide with pyridine, neodymium(III) bromide with 2-ethylhexanol, neodymium (III) bromide with ethanol, preferably lanthanum(III) chloride with tributyl phosphate, lanthanum(III) chloride with pyridine, lanthanum(III) chloride with 2-ethylhexanol, praseodymium(III) chloride with tributyl phosphate, praseodymium(III) chloride with 2-ethylhexanol, neodymium(III) chloride with tributyl phosphate, neodymium(III) chloride with tetrahydrofuran, neodymium (III) chloride with 2-ethylhexanol, neodymium(III) chloride with pyridine, neodymium(III) chloride with 2-ethylhexanol, neodymium(III) chloride with ethanol.

Neodymium versatate, neodymium octanoate and/or neodymium naphthenate are particularly preferably used as compounds of the rare earth metals.

The aforementioned compounds of the rare earth metals may be used individually as well as in mixtures with one another. The most favourable mixing ratio can readily be determined by appropriate preliminary tests.

As cyclopentadienes (component (b)), compounds of the formulae (I), (II) or (III)

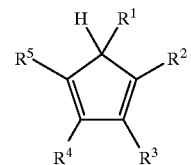

(I)

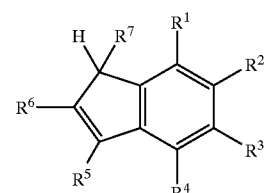

(II)

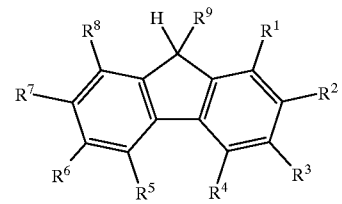

(III)

are used, in which $R^1$ to $R^9$ are the same or different or are optionally joined to one another or are condensed on the cyclopentadiene of the formulae (I), (II) or (III), and denote hydrogen, a $C_1$- to $C_{30}$-alkyl group, a $C_6$- to $C_{10}$-aryl group, a $C_7$- to $C_{40}$-alkylaryl group, a $C_3$- to $C_{30}$-silyl group, wherein the alkyl groups may either be saturated or singly or multiply unsaturated and may contain hetero atoms such as oxygen, nitrogen or halides. In particular the radicals may denote hydrogen, methyl, ethyl, n-propyl, isopropyl, n-butyl, isobutyl, tert.-butyl, phenyl, methylphenyl, cyclohexyl, benzyl, trimethylsilyl or trifluoromethyl.

Examples of cyclopentadienes are unsubstituted cyclopentadiene, methyl cyclopentadiene, ethyl cyclopentadiene, n-butyl cyclopentadiene, tert.-butyl cyclopentadiene, vinyl cyclopentadiene, benzyl cyclopentadiene, phenyl cyclopentadiene, trimethylsilyl cyclopentadiene, 2-methoxyethyl cyclopentadiene, 1,2-dimethyl cyclopentadiene, 1,3-dimethyl cyclopentadiene, trimethyl cyclopentadiene, tetramethyl cyclopentadiene, tetraphenyl cyclopentadiene, tetrabenzyl cyclopentadiene, pentamethyl cyclopentadiene, pentabenzyl cyclopentadiene, ethyl-tetramethyl cyclopentadiene, trifluoromethyl-tetramethyl cyclopentadiene, indene, 2-methylindenyl, trimethylindene, hexamethylindene, heptamethylindene, 2-methyl-4-phenylindenyl, fluorene or methylfluorene.

The cyclopentadienes may likewise be used either individually or mixed with one another.

As alumoxane (component (c)) aluminium-oxygen compounds are used which, as is known to the person skilled in the art, are obtained by contacting aluminium organyls with condensing components, for example water, and which contain non-cyclic and/or cyclic compounds of the formula (—Al(R)O—)$_n$, R being the same or different and denoting a linear or branched $C_1$- to $C_{10}$-alkyl group that may contain hetero atoms such as oxygen or halogens. In particular R denotes methyl, ethyl, n-propyl, iso-propyl, n-butyl, iso-butyl, tert.-butyl, n-octyl or iso-octyl, and particularly preferably methyl, ethyl, or iso-butyl. Examples of alumoxanes that may be mentioned are: methyl alumoxane, ethyl alumoxane and iso-butyl alumoxane, methyl alumoxane and iso-butyl alumoxane being preferred.

The aluminium oxanes can likewise either be used individually or mixed with one another.

It is also possible to add a further component (d) to the approved catalyst components (a) to (c). This component (d) may be a conjugated diene, which may be the same diene that is subsequently to be polymerised using the catalyst. Butadiene and/or isoprene are preferably used.

If the component (d) is added to the catalyst, then the amount of (d) is preferably 1 to 1000 mol, referred to 1 mol of the component (a), particularly preferably 1 to 100 mol, 1 to 50 mol of (d), referred to 1 mol of the component (a), are most particularly preferably used.

The catalyst according to the invention is prepared by mixing the components (a) to (d) together in any arbitrary sequence in an inert solvent and/or diluent. The individual components may if desired be added without solvent to the solvent and/or diluent in a vessel, or may be mixed with one another dissolved or suspended in a suitable solvent and/or diluent.

The solvents and/or diluents may be the same or different to the solvent in which the polymerisation takes place. The catalyst is prepared at temperatures ranging between the melting point and the boiling point of the solvents that are used. temperatures of −80 to 140° C. are suitable, temperatures of −40 to 100° C. being particularly suitable. The catalyst may be prepared in a separate stage or by adding the catalyst components present individually or partially in the mixture, to the polymerisation batch, the addition of the monomer taking place before, during or after the addition of the catalyst components.

Aromatic, aliphatic and cycloaliphatic hydrocarbons are suitable as inert solvents and/or diluents, for example benzene, toluene, pentane, n-hexane, iso-hexane, heptane and cyclohexane, and/or halogenated hydrocarbons, for example dichloromethane and chlorobenzene. The solvents may be the same or different for all components and may also be used mixed with one another.

The catalysts according to the invention are suitable for polymerising unsaturated organic compounds, in particular for polymerising conjugated dienes, for example 1,3-butadiene, isoprene, 2-phenyl-1,3-butadiene, 1,3-pentadiene, 2-methyl-1,3-pentadiene, 4-methyl-1,3-pentadiene and/or 2,4-hexadiene. Furthermore, in the polymerisation of the dienes one or more 1-olefin(s) may optionally be added, for example ethylene, propene, 1-butene, 1-hexene, 1-octene, styrene, methylstyrene. In addition the polymerisation may of course also be carried out in the presence of further compounds that may serve for example to regulate the molecular weight, such as hydrogen or 1,2-butadiene.

The polymerisation of the conjugated dienes, optionally in admixture with 1-olefins, may be carried out in a conventional manner as described for example in EP 11 184. The amount of optionally added 1-olefins is governed by, inter alia, the intended use or the polydienes to be produced. The quantitative ratio can therefore easily be determined by appropriate preliminary experiments.

A particularly suitable procedure for producing the catalyst is to prepare the catalyst separately by mixing the catalyst components (a), (b), (c) and (d) together in any arbitrary sequence in a suitable solvent and/or diluent at temperatures of −40° to 80° C. and then after a suitable reaction time to add the whole catalyst solution to the polymerisation vessel. The preferred reaction time is governed by the temperature and may lie in the range from 1 minute to several days, an increase in the reaction time having an adverse effect on the properties of the catalyst.

The sequence of the addition of the catalyst components has no effect on the formation of the catalyst. The addition of the components may take place simultaneously or successively. A suitable procedure is for example to add the components in the sequence: solvent-(d)-(a)-(b)-(c) or in the sequence: solvent-(d)-(c)-(b)-(a).

The polymerisation is carried out by adding the catalyst together with a solution of the monomer in a suitable solvent. The amount of catalyst employed referred to 100 g of monomer is in the range from 0.01 to 10 mmol of component (a), preferably in the range from 0.02 to 1 mmol of component (a). The solvents used should be inert with respect to the catalyst. Suitable solvents are for example aromatic, aliphatic and cycloaliphatic hydrocarbons, such as benzene, toluene, pentane, n-hexane, iso-hexane, heptane and/or cyclohexane. The polymerisation is carried out at temperatures of 0 to 150° C. preferably 20 to 130° C.

In a conventional procedure the catalyst system is added to a mixture of 100 parts by weight of solvent with 5 to 50 parts by weight, preferably 8 to 40 parts by weight of monomer. The polymerisation starts immediately, as is recognisable by the evolution of heat. After the desired conversion has been achieved the catalyst is deactivated by adding small amounts of suitable deactivators, for example water, carboxylic acids or alcohols. Suitable stabilisers, for example sterically hindered phenols or aromatic amines, are added in the conventional amounts to the polymer solution before it is worked up. The polymers are isolated in a manner known per se, for example by evaporating the polymer solution or precipitating the polymer with a non-solvent, for example methanol, ethanol or acetone, or by steam distillation of the solvent. Drying is carried out by conventional methods, for example in a drying cabinet or in a screw-conveyor dryer.

It is also possible to carry out the polymerisation of diolefins with the described catalysts without the addition of solvents. The polymerisation may be carried out in liquid monomers or, if the catalyst is suitably supported, also in the gaseous phase.

The new catalyst system is particularly characterised by the fact that it is easy to prepare, and that it is possible to control the ratios of cis-trans double bonds in a wide range by the nature of the cyclopentadienes that are used as well as by the conduct of the reaction. Irrespective of the reaction conditions, the content of lateral vinyl groups remains almost unaltered in the range from about 3 to 15%, preferably in the narrower range from 5 to 12%, and can be selectively influenced by the nature of the cyclopentadienes used.

The following examples are intended to illustrate the present invention without however restricting the latter thereto.

EXAMPLES

The examples were carried out with purified solvents (n-hexane and toluene) and monomers (1,3-butadiene) with the exclusion of air and moisture and under an argon atmosphere. The solution polymerisations were carried out under argon in 0.5 litre flasks scaled with a septum. The determination of the selectivity of the polybutadiene (1,4-cis, 1,4-trans and 1,2-double bonds) was carried out by means of IR spectroscopy.

Examples 1 to 9

Ageing 0.23 ml (2 mmol) of indene, 36.1 ml of a 1.66 molar solution of MAO (methyl alumoxane) in toluene and 5.33 g of 1,3-butadiene were added under argon to a solution of 2 mmol of NDV (neodymium(III) versatate) in 5.7 ml of n-hexane at 25° C. in a 20 ml shaker vessel, and the resultant mixture was made tip to a total volume of 50 ml with toluene. The catalyst solution was stirred with a magnetic stirrer, and the reaction temperature was adjusted by means of an outer bath. The temperatures and the ageing times are given in Tables 1 and 2.

Polymerisation

The polymerisation took place in a 0.5 litre flask provided with a crown cork with integrated septum. 150 ml of n-hexane was placed under argon in the flask, the flask was then sealed with a septum, the specified amount of 1.3-butadiene was added continuously through a cannula and the specified amount of the aged catalyst solution was next added using a syringe. During the polymerisation the temperature was adjusted a water bath. The polymer was isolated after the specified reaction time by precipitating the polymer solution in methanol BKF and dried for 1 day in a vacuum drying-cabinet at 60° C. The batch sizes, reaction conditions and the properties of the polymer obtained are given in Tables 1 and 2.

TABLE 1

Examples 1 to 5

|  | Example 1 | Example 2 | Example 3 | Example 4 | Example 5 |
|---|---|---|---|---|---|
| Ageing | | | | | |
| Temperature | −20° C. | 4° C. | 30° C. | 30° C. | 50° C. |
| Reaction time | 4 h | 1 h | 1 h | 4 h | 1 h |
| Polymerisation | | | | | |
| Catalyst solution | 5 ml | 5 ml | 5 ml | 5 ml | 5 ml |
| Nd component | 0.2 mmol | 0.2 mmol | 0.2 mmol | 0.2 mmol | 0.2 mmol |
| n-hexane | 150 ml | 150 ml | 150 ml | 150 ml | 150 ml |
| 1,3-butadiene | 21.63 g | 19.86 g | 20.71 g | 21.53 g | 24.14 g |
| Temperature | 60° C. | 60° C. | 60° C. | 60° C. | 60° C. |
| Reaction time | 3.5 h | 3.5 h | 3.5 h | 3.5 h | 3.5 h |
| Polymer | | | | | |
| BR* | 6.16 g | 10.65 g | 13.60 g | 20.43 g | 21.04 g |
| cis/trans/1,2 in % | 43/52/5 | 41/54/5 | 48/49/4 | 39/57/4 | 40/56/4 |

*butadiene rubber

TABLE 2

Examples 6 to 9

|  | Example 6 | Example 7 | Example 8 | Example 9 |
|---|---|---|---|---|
| Ageing | | | | |
| Temperature | 50° C. | 50° C. | 50° C. | 50° C. |
| Reaction time | 2 h | 2.5 h | 24 h | 24 h |
| Polymerisation | | | | |
| Catalyst solution | 5 ml | 2 ml | 1 ml | 1 ml |
| Nd component | 0.2 mmol | 0.08 mmol | 0.04 mmol | 0.04 mmol |
| n-hexane | 150 ml | 150 ml | 150 ml | 150 ml |
| 1,3-butadiene | 19.68 g | 21.05 g | 24.60 g | 21.79 g |
| Temperature | 60° C. | 60° C. | 60° C. | 60° C. |
| Reaction time | 1 h | 1 h | 1 h | 0.5 h |
| Polymer | | | | |
| BR* | 20.04 g | 17.10 g | 20.06 g | 10.98 g |
| cis/trans/1,2 in % | 39/56/5 | 51/45/4 | 60/35/5 | 74/21/5 |

Examples 10 to 19

Ageing

In each case 2 mmol of tile cyclopentadienes specified in Table 3, 36.1 ml of a 1.66 molar solution of MAO (methyl alumoxane) in toluene and 5.33 g of 1,3-butadiene were added under argon to a solution of 2 mmol of NDV (neodymium(III) versatate) in 5.7 ml of n-hexane at 25° C. in a 20 ml shaker vessel, and the resultant mixture was made up with toluene to a total volume of 50 ml. The catalyst solution was stirred with a magnetic stirrer, and the reaction temperature was adjusted by means of an outer bath. The temperatures and tile ageing times are given in Tables 3 and 4.

Polymerisation

The polymerisation was carried out in the same way as described for Examples 1 to 9. The bath sizes, reaction conditions and the properties of the polymer obtained are shown in Tables 3 and 4.

TABLE 3

Examples 10 to 14

|  | Pentamethyl-cyclopentadiene | | | Tetramethyl-cyclopentadiene | |
|---|---|---|---|---|---|
| Cyclopentadiene | Example 10 | Example 11 | Example 12 | Example 13 | Example 14 |
| Ageing | | | | | |
| Temperature | 50° C. | 50° C. | 30° C. | 30° C. | 50° C. |
| Reaction time | 2 h | 1 h | 4 h | 4 h | 1 h |
| Polymerisation | | | | | |
| Catalyst solution | 5 ml | 1 ml | 0.5 ml | 5 ml | 1 ml |
| Nd component | 0.2 mmol | 0.04 mmol | 0.08 mmol | 0.2 mmol | 0.04 mmol |
| n-hexane | 150 ml | 150 ml | 150 ml | 150 ml | 150 ml |
| 1,3-butadiene | 19.50 g | 21.73 g | 22.48 g | 23.19 g | 20.03 g |
| Temperature | 60° C. | 60° C. | 40° C. | 60° C. | 60° C. |
| Reaction time | 1 h | 1 h | 1 h | 1 h | 1 h |
| Polymer | | | | | |
| BR* | 19.33 g | 19.89 g | 1.66 g | 23.04 g | 18.14 g |
| cis/trans/1,2 in % | 21/70/9 | 43/47/10 | 76/13/11 | 32/61/6 | 45/50/6 |

*butadiene rubber

TABLE 4

Examples 15 to 19

|  | Di(tert-butyl)cyclopentadiene | Cyclopentadiene | Methyl cyclopentadiene | Fluorene | |
|---|---|---|---|---|---|
| Cyclopentadiene | Example 15 | Example 16 | Example 17 | Example 18 | Example 19 |
| Ageing | | | | | |
| Temperature | 50° C. | 50° C. | 50° C. | 25° C. | 25° C. |
| Reaction time | 1 h | 19 h | 2 h | 12 h | 12 h |
| Polymerisation | | | | | |
| Catalyst solution | 5 ml | 1 ml | 5 ml | 5 ml | 5 ml |
| Nd component | 0.2 mmol | 0.04 mmol | 0.2 mmol | 0.2 mmol | 0.2 mmol |
| n-hexane | 150 ml | 150 ml | 150 ml | 150 ml | 150 ml |
| 1,3-butadiene | 24.32 g | 24.13 g | 21.04 g | 17.07 g | 17.07 g |
| Temperature | 60° C. | 60° C. | 60° C. | 60° C. | 60° C. |
| Reaction time | 1 h | 1 h | 1 h | 1 h | 1 h |

TABLE 4-continued

| | Di(tert-butyl)cyclopentadiene | Cyclopentadiene | Cyclopentadiene | Methyl cyclopentadiene | Fluorene |
|---|---|---|---|---|---|
| Cyclopentadiene | Example 15 | Example 16 | Example 17 | Example 18 | Example 19 |
| Polymer | | | | | |
| BR | 8.44 g | 8.48 g | 21.02 g | 15.40 g | 9.42 g |
| cis/trans/1,2 in % | 19/76/9 | 45/50/5 | 25/68/6 | 43/54/4 | 68/27/4 |

Examples 15 to 19

Comparison Example 20

The polymerisation took place in a 0.5 litre flask provided with a crown cork with integrated septum. Solutions of 0.12 mmol of neodymium(III) versatate in 0.342 ml of n-hexane, 4.0 mmol of di(iso-butyl) aluminium hydride in 2 ml of n-hexane and 0.24 mmol of ethyl aluminium sesquichloride in 0.24 ml of n-hexane were added successively under argon to a solution of 24.1 g of 1,3-butadiene in 150 ml of n-hexane (molar amounts of di(iso-butyl) aluminium hydride and ethyl aluminium sesquichloride referred to aluminium). The reaction solution was kept for 1 hour at 60° C. and the polymer was then isolated by precipitating the polymer solution in methanol/BKF and was dried for 1 day in a vacuum drying cabinet at 60° C. 20.4 g of polybutadiene were obtained having a selectivity distribution of 92.5% 1,4-cis-, 7% of 1,4-trans- and 0.5% 1,2-double bonds.

What is claimed is:

1. A catalyst, based on compounds of the rare earth metals, comprising:
   (a) a rare earth metal compound, wherein said rare earth metal compound is a rare earth metal alcoholate or carboxylate, a complex of a rare earth metal with a diketone, an addition compound of a rare earth metal halide with an oxygen donor or nitrogen donor compound, or a mixture thereof,
   (b) a cyclopentadiene, and
   (c) an alumoxane,
      wherein the molar ratio of the components (a):(b):(c) is in the range 1:(0.1 to 1.99):(0.1 to 1000).
2. A catalyst according to claim 1 wherein the molar ratio of components (a):(b):(c) is in the range 1:(0.2 to 1.8):(1 to 500).
3. A catalyst according to claim 1 wherein the molar ratio of components (a):(b):(c) is in the range 1:(0.5 to 1.5):(5 to 100).
4. A catalyst according to claim 1 wherein the rare earth metal compound is neodymium versatate, neodymium octanoate, neodymium naphthenate or a combination thereof.
5. A catalyst according to claim 1 additionally comprising
   (d) 1 to 1000 mol of a conjugated diene per 1 mol of component (a).
6. A process for preparing a catalyst according to claim 1 comprising mixing together components (a), (b), and (c) and optional component (d) in any order in an inert solvent and/or a diluent other than such solvent.
7. A method comprising polymerizing unsaturated organic compounds in the presence of a catalyst according to claim 1.
8. A method according to claim 7 comprising polymerizing a conjugated diene, or a conjugated diene in conjunction with a 1-olefin.

* * * * *